(12) United States Patent
Desmeules

(10) Patent No.: US 8,262,322 B2
(45) Date of Patent: Sep. 11, 2012

(54) PILE WITH INTEGRAL GEOTHERMAL CONDUIT LOOP RETAINING MEANS

(76) Inventor: Alain Desmeules, Montreal (CA)

( * ) Notice: Subject to any disclaimer, the term of this patent is extended or adjusted under 35 U.S.C. 154(b) by 336 days.

(21) Appl. No.: 12/683,483

(22) Filed: Jan. 7, 2010

(65) Prior Publication Data

US 2011/0091288 A1   Apr. 21, 2011

(30) Foreign Application Priority Data

Oct. 19, 2009   (CA) ...................................... 2683256

(51) Int. Cl.
*E21B 33/13* (2006.01)
(52) U.S. Cl. ............. 405/231; 166/290; 175/56; 175/57
(58) Field of Classification Search .................. 405/231, 405/239, 240, 246; 175/56; 166/290
See application file for complete search history.

(56) References Cited

U.S. PATENT DOCUMENTS

| 4,143,710 | A  | * | 3/1979 | La Porte et al. ............... 165/182 |
| 6,672,371 | B1 | * | 1/2004 | Amerman et al. .............. 165/45  |
| 7,108,458 | B1 | * | 9/2006 | Davie et al. ................... 405/230 |

FOREIGN PATENT DOCUMENTS

| EP | 0032272 A2 | 7/1981 |
| EP | 0189733 A1 | 8/1986 |
| GB | 2463237 A  | 3/2010 |
| JP | 2003206528 A | 7/2003 |
| JP | 2005188866 A | 7/2005 |

* cited by examiner

*Primary Examiner* — Tara Mayo-Pinnock
*Assistant Examiner* — Benjamin Fiorello
(74) *Attorney, Agent, or Firm* — Norton Rose Canada LLP

(57) ABSTRACT

A pile adapted to be driven into the ground and having retaining formations to retain one or more geothermal conduit loops. Each conduit loop is formed by opposed longitudinal conduit sections interconnected at a lower end by an interconnecting section. The conduit loops are adapted for flow of a heat exchange fluid therein. The retaining formations retain the one or more conduit loops in close proximity to the pile through the attachment means as the pile is driven into the ground.

83 Claims, 4 Drawing Sheets

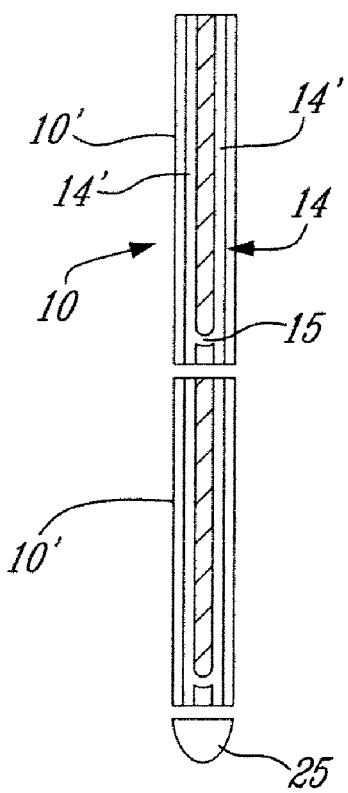 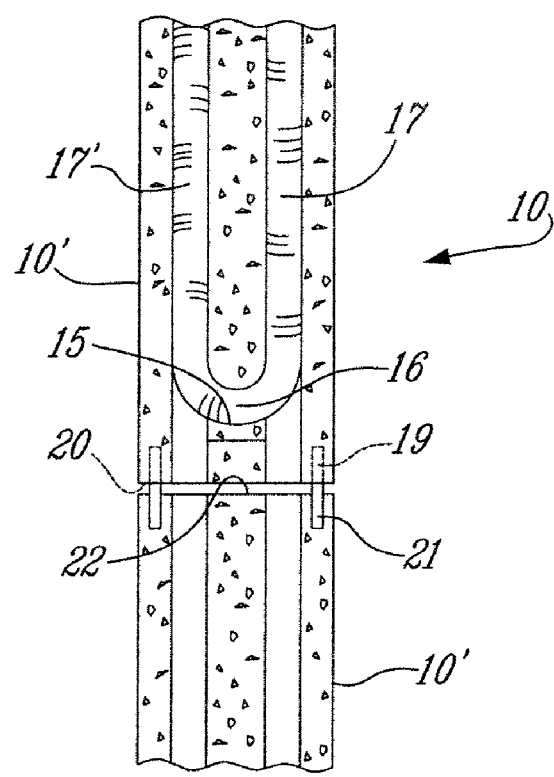
FIG. 1  FIG. 2
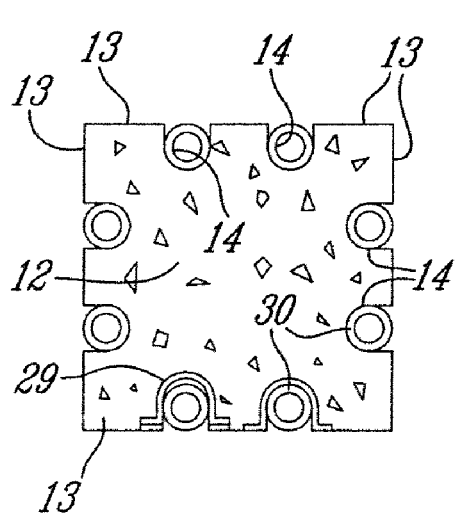 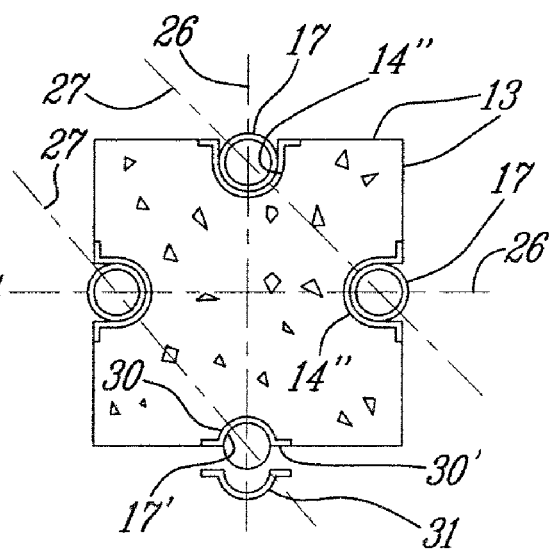
FIG. 3  FIG. 4

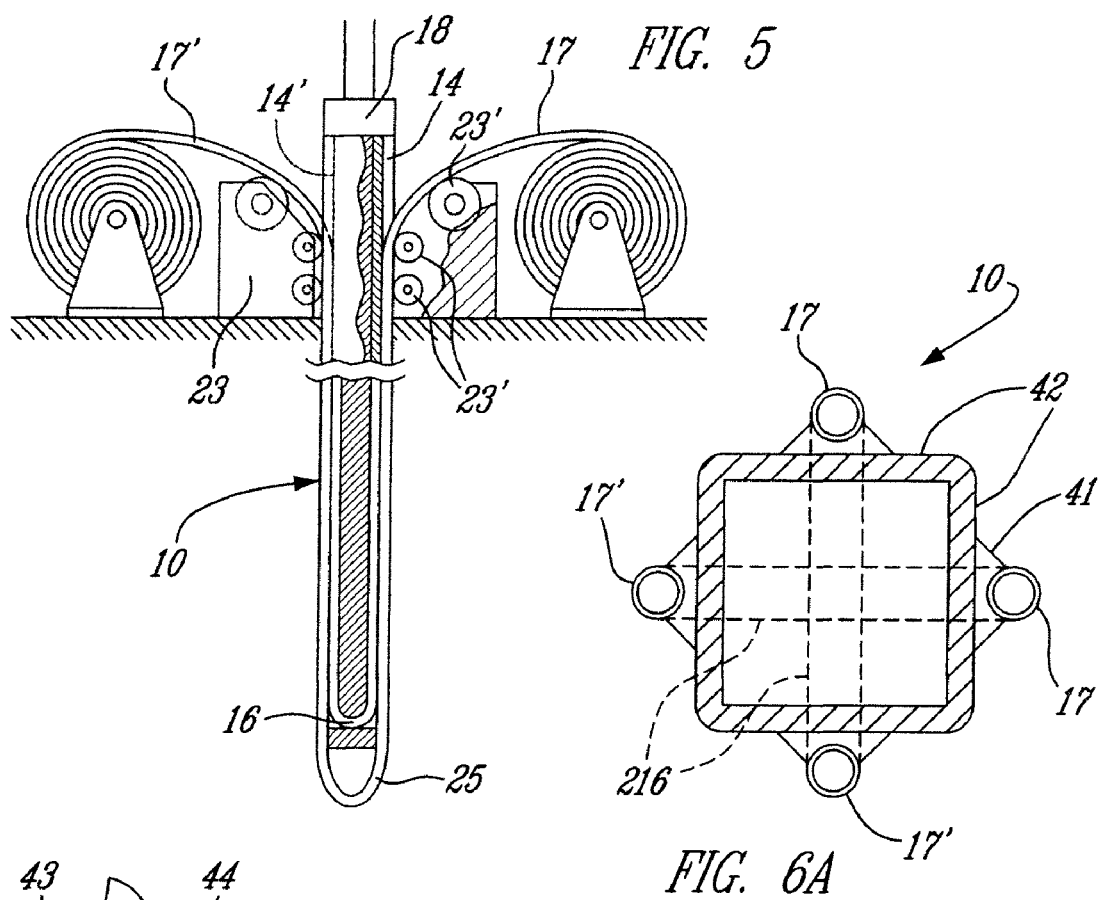
FIG. 5
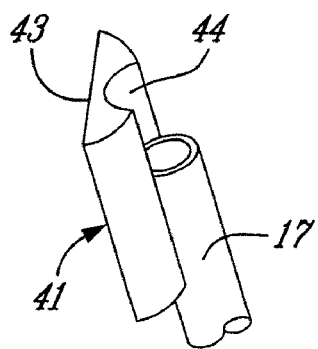
FIG. 6A
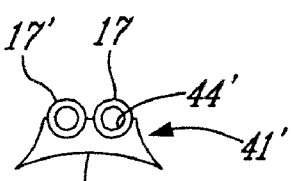
FIG. 7A
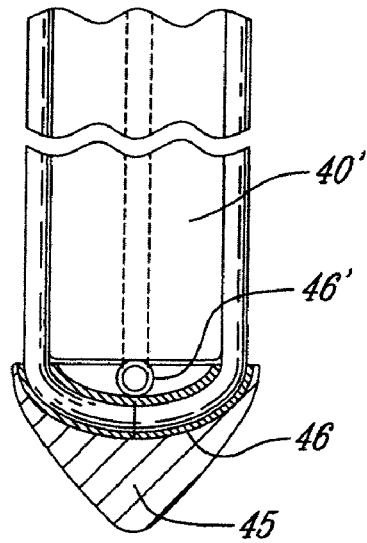
FIG. 6B
FIG. 7B

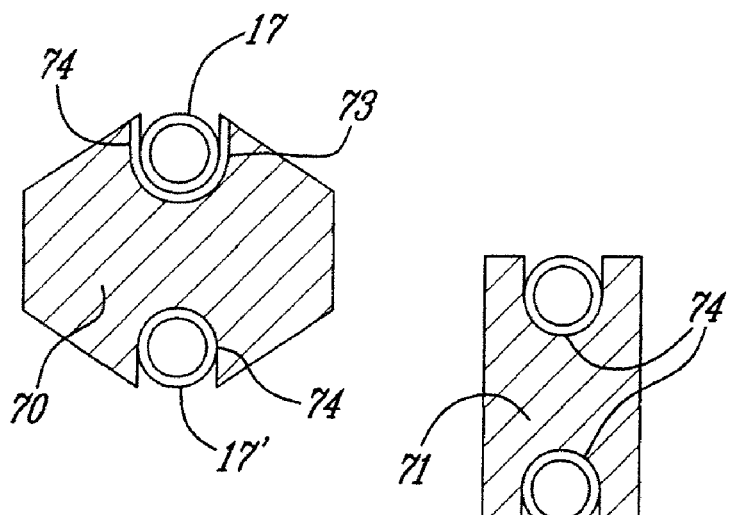
FIG. 11
FIG. 12
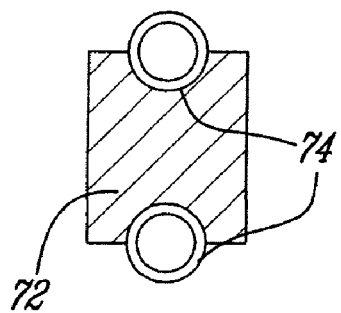
FIG. 13
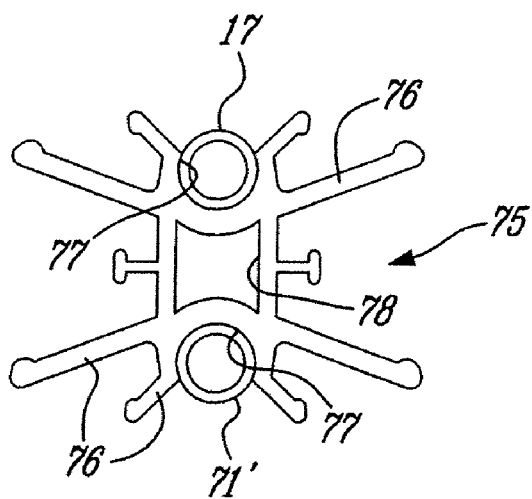
FIG. 14
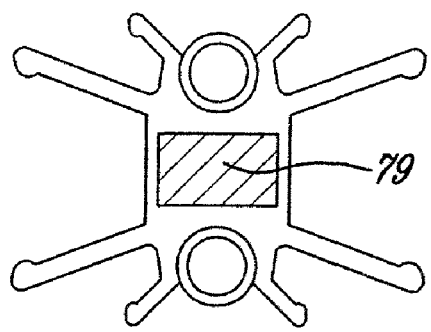
FIG. 15

PILE WITH INTEGRAL GEOTHERMAL CONDUIT LOOP RETAINING MEANS

TECHNICAL FIELD

The present invention relates to a pile with integral geothermal conduit loop retaining capability whereby to position the geothermal conduit loop into the ground adjacent the pile.

BACKGROUND ART

Geothermal conduits placed in ground-require the driving of a hollow steel pipe into the ground and inserting a conduit loop into the steel pipe. A conductive filler material such as silica sand or grout is then inserted into the pipe to fill the empty space and provide conductivity to conduct heat from the ground and transfer it to the fluid circulated in the conduit loop or vice-versa. These systems are expensive to install and require different crews. They are also not efficient in thermal exchange.

In my co-pending application Ser. No. 12/320,754 entitled "System and method for geothermal conduit loop in-ground installation and soil penetrating head therefor" and my co-pending application Ser. No. 12/497,560 entitled "Soil penetrating plate assembly to position geothermal conduit loops in soil", I describe means to position a geothermal conduit loop into the ground with the means being retractable and reusable. In my first application a force transmitting shaft is driven into the ground by a percussion drill or other impacting apparatus and in some applications the head which holds the conduit loop remains in the ground with the shaft being retracted therefrom. In my second application, I describe a soil penetrating plate assembly provided with conduit loop attaching means which greatly facilitate the installation of the conduit loop into the soil and which permits easy retrieval of the soil penetrating plate and shaft, a system which is inexpensive.

SUMMARY OF INVENTION

According to a feature of the present invention, there is provided a pile of the type which is driven into the ground and which is adapted to permanently retain one or more geothermal conduit loops. The pile is used as a support for structures.

Another feature of the present invention is to provide a pile which is casted from concrete or other suitable material and formed in sections and wherein the sections are adapted to position one or more geothermal conduit loops at different depths along a sidewall of the pile.

Another feature of the present invention is to provide a pile which is adapted to be driven into the ground to position one or more geothermal conduit loops adjacent thereto and wherein the pile is provided with attachment means in the form of channels provided in the sidewalls of the pile and which may have a metal liner therein to provide improved thermal conductivity of the conduit loops to absorb heat from the ground or radiate heat into the ground.

According to a further broad aspect of the present invention there is provided a pile which is adapted to be driven into the ground to position one or more geothermal conduit loops adjacent the pile and wherein a guide collar is positioned about the pile over a top surface of the ground whereby to guide opposed longitudinal conduit sections of the conduit loops with respective attachment means secured to the pile to precisely position the conduit sections with respect to the pile sidewalls.

According to the above features, from a broad aspect, the present invention provides a pile adapted to be driven into the ground and having retaining means to retain one or more geothermal conduit loops. Each conduit loop is formed by opposed longitudinal conduit sections interconnected at a lower end by an interconnecting section. The conduit loops are adapted for flow of a heat exchange fluid therein. The retaining means retains the one or more conduit loops in close proximity to the pile through the attachment means as the pile is driven into the ground.

According to a further broad aspect of the present invention the pile is casted pile constructed of a solid mass material and the retaining mean is formed by channels casted in the outer side face of the pile.

According to a further broad aspect of the present invention the pile is hollow steel pile and the retaining means is constituted by guide channel elements secured to the outer surface of the hollow steel pile.

BRIEF DESCRIPTION OF DRAWINGS

A preferred embodiment of the present invention will now be described with reference to the accompanying drawings in which:

FIG. 1 is a side view illustrating a casted concrete pile formed by pile sections and wherein the pile sections are provided with retaining channels adapted to retain therein opposed longitudinal conduit sections and a lower interconnecting section of one or more geothermal conduit loops;

FIG. 2 is an enlarged view of two pile sections adapted to be connected together and illustrating a conduit loop bottom section secured and retained in the conduit retaining channels of one of the pile sections;

FIG. 3 is a transverse cross-section view showing a casted concrete pile having four opposed flat surfaces casted with loop retaining channels and wherein there are four conduit loops retained in the sidewalls of the concrete pile;

FIG. 4 is a transverse section view similar to FIG. 3 but showing a pile having conduit retaining channels which are lined with a metal liner to receive a portion of a longitudinal conduit section of two conduit loops and wherein a thermally conductive protection cover is secured over the conduit to provide protection to the conduit while permitting thermal conductivity;

FIG. 5 is a simplified fragmented side view showing a conduit loop being positioned into the ground as a pile is driven into the ground and wherein a guide collar is positioned about the pile over the top surface of the ground and adapted to guide the conduit longitudinal side sections in respective channels as the pile is driven into the ground;

FIG. 6A is a transverse cross-section view showing a pile which is formed as a hollow steel pile and provided with guide channel elements welded to the outer sidewalls of the pile to guide and retain the longitudinal conduit sections of the geothermal conduit loops, herein two loops disposed at 90 degrees to one another;

FIG. 6B is a simplified fragmented side view showing the lower end of the pile of FIG. 6A and wherein the interconnecting sections of the conduit loops criss-cross in a protective head secured to the bottom end of the pile;

FIG. 7A is a fragmented perspective view of the guide channel elements of FIG. 6A;

FIG. 7B is a cross-section view showing a modification of the guide channel elements of FIG. 7A;

FIGS. 11 to 13 are cross-section views of extruded force transmitting shafts or piles; and FIGS. 14 and 15 are cross-section views of aluminum extruded force transmitting shafts or piles.

DESCRIPTION OF PREFERRED EMBODIMENTS

Figure 8:
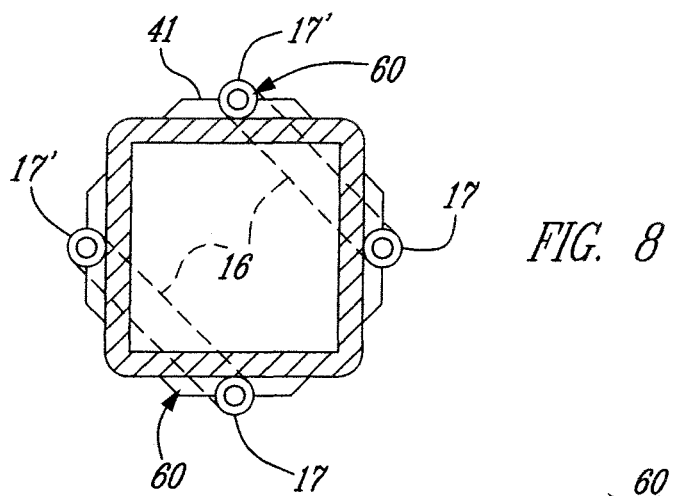
FIG. 8 is a transverse cross-section view of a hollow steel pile showing a further embodiment and wherein two geothermal conduit loops are secured to the pile in substantially parallel relationship and extending diagonally across two adjacent sidewalls.

Referring now to the drawings and more particularly to FIGS. 1 to 5, there is shown generally at 10 a pile, herein two pile sections 10', of the type adapted to be driven into the ground, such as the ground 11 illustrated in FIG. 5. The pile 10, herein illustrated in FIG. 3, is casted from concrete 12 or any other suitable solid mass material. As herein shown the sidewalls 13 of the pile are casted with conduit loop retaining means herein in the form of at least two channels 14, eight channels 14 being shown in the embodiment of FIG. 3. These channels 14 have a straight channel section 14' and an interconnecting passage 15 formed across the straight channel section 14' whereby to receive therein an interconnecting lower end section 16 of a geothermal conduit loop formed by opposed longitudinal conduit sections 17 and 17' and the interconnecting end section 16, as illustrated in FIG. 2.

As the pile 10 is driven into the ground by suitable impacting means, such as the percussion head 18' illustrated in FIG. 5, the pile 10 draws the conduit loops into ground due to its attachment within the channels 14 as illustrated in FIG. 2. As shown in FIG. 1 the pile may be constructed of a plurality of pile sections 10' interconnected end-to-end by suitable interconnection means. As shown in FIG. 2 this interconnection means may be constituted by locating pins 19' projecting from a bottom end 20 of a pile section 10' and a pin locating hole 21 formed in a top surface 22 of the pile section 10' so that these pile sections perfectly align with one another and remain in interconnected alignment as it is driven to the ground. Of course, other suitable interconnecting means or end connectors are contemplated.

As shown in FIG. 5, a guide collar 23 may be positioned about the pile 10 over the top surface of the ground 11 to guide opposed longitudinal conduit sections 17 and 17', of rolls or conduit, into respective ones of the channels 14' formed in opposed sidewall of the pile 10 as the pile is driven into the ground. Guide rolls 23' guide the conduits 17 and 17' into their respective channel sections 14 and 14'. The channels may also be designed whereby the conduits are press-fitted therein by the guide rolls 23', similar to a zip-lock bag. This eliminates air from about the contact area between the conduits and the channels. The interconnecting passage 15 draws the opposed longitudinal conduit sections 17 and 17' with the pile as the pile is driven into the ground.

As shown in FIG. 1 some or all of the pile sections may be provided with an interconnecting passage 15 thereby making it possible to locate a conduit loop at different depths within the ground by simply securing the conduit loop to sections above one or several lower ones of the pile sections. The lower one of the pile sections is shown in FIG. 1 as having a ground penetrating head 25 secured thereto. This head 25 may have various configurations as obvious to a person skilled in the art and as described in my above-mentioned co-pending patent applications.

As shown in the embodiment of FIG. 3 there can be four geothermal conduit loops secured to the pile, one in each of the sidewalls 13 thereof. FIG. 4 shows an embodiment wherein there are two geothermal conduit loops secured to the pile and wherein the sidewalls 13 are provided with a single channel 14". The conduit loops which have two opposed longitudinal conduit sections 17 and 17' may be disposed along transverse axes 26 with the lower interconnecting end section 16 of the two conduit loops crossing at right angles in the ground penetrating head 25 as shown in FIG. 1 and FIG. 6B. Alternatively, the conduit loops may be disposed along diagonal axes 27 with interconnecting lower end sections 16 of the conduit loops crossing at opposed diagonal corners of the pile.

FIGS. 3 and 4 also illustrate that the channels 14 and 14" may be provided with metal liners 30 permanently secured within the channels and adapted to be in flush contact with a portion of the other surface of the straight section of the geothermal conduits 17 and 17' to provide improved thermal conductivity for heat exchange therewith. A thermally conductive protective cover 31 may also be secured to the metal liner flanges 30' to encapsulate the opposed longitudinal conduit sections 17 and 17' therein to provide protection thereof while permitting thermal conductivity. An insulating liner 29 may also be interposed between the metal liner and the concrete 12.

These geothermal conduits are connected to heat exchange equipment which circulate a fluid therein whereby to extract heat from the ground for heating purposes or to release heat into the ground for cooling purposes. The channels 14 and 14" are of U-shaped cross-sections with the channels of FIG. 3 being much deeper whereby the conduits are recessed from the outer surfaces 13 of the concrete pile. Thus, the conduits are protected from the aggregate or other obstacles in the ground. The solid mass pile 10 is herein casted of concrete or reinforced concrete but it could also be made of metal, wood, structural plastics or any suitable hard material. The pile may also be square, rectilinear or circular or have any another suitable cross-sectional shapes.

With reference now to FIG. 6A to 10 the piles as herein shown are constituted hollow steel piles and wherein the retaining means is differently formed. As shown in FIG. 6A the hollow steel pile 40 is provided with guide channel elements 41 which are welded on the outer sidewall 42 of the steel pile 40. The guide channel elements 41 are better illustrated in FIGS. 7A and 7B. As shown in FIG. 7A the guide channel 41 is an elongated metal strip provided flat wall 43 adapted to be welded to the outer sidewall 42 of the steel pile. A concave channel 44 is formed in the outer surface of the guide channel element 41 and dimensioned for close fit contact with a portion of the conduit sections 17 and 17'. As shown in FIG. 6A the interconnecting end sections 16 of each of the two conduit loops cross at 90 degrees to one another in a lower end 40' of the pile in a ground penetrating head 45 formed with coupling means 46 and 46' to attach with a respective one of the interconnecting end sections 16 of the two geothermal conduit loops.

Figure 10:
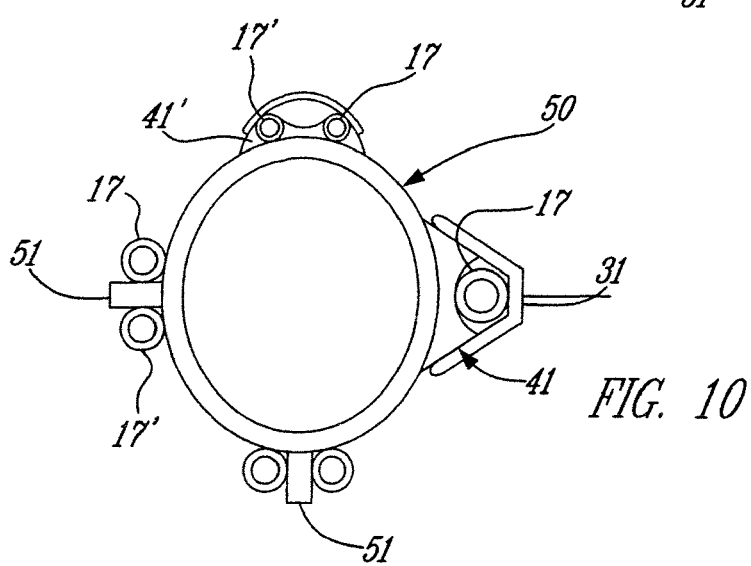
FIG. 10 is a transverse section view of hollow steel pile of circular cross-sections having guide channel elements secured to the outer sidewall thereof for retaining one or more geothermal conduit loops thereto and herein illustrating different types of guide channel elements and hook members.

FIG. 7B shows a guide channel element 41' wherein the connecting surface 47 is a curved surface whereby to secure same by welding to a circular hollow steel pile 50 as shown in FIG. 10. The guide channel element 41' may also be provided with a pair of concave channels 44' in an outer surface thereof to receive both longitudinal conduit sections 17 and 17' of a geothermal conduit loop.

Figure 9:
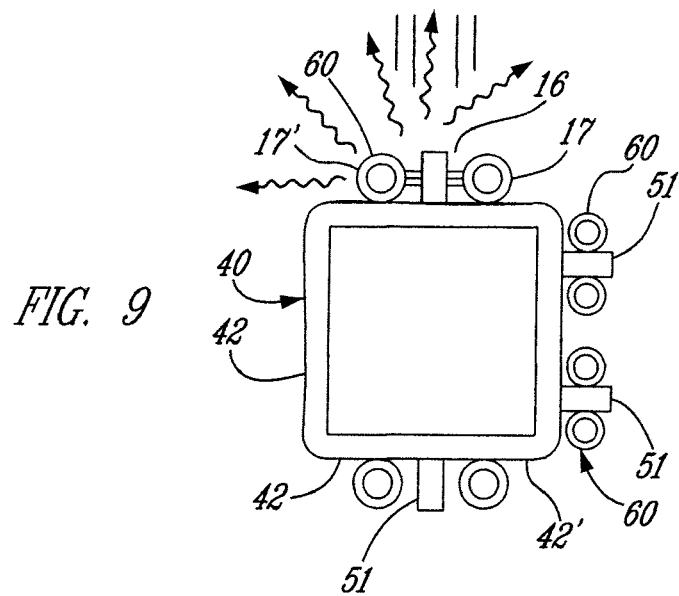
FIG. 9 is a transverse section view showing a hollow steel pile and wherein the conduit retaining means is provided by hook members permanently secured to one or more of the sidewalls of the pile for retaining a plurality of conduit loops thereto.

Referring now to FIG. 9 there is shown a further modification of the hollow steel pile 40 as illustrated in FIG. 6A. As herein shown, the retaining means for the geothermal conduit loops is provided by one or more hook members 51 secured to one or more of the sidewalls 42 of the pile 40 and such hooks are adapted to receive thereunder the interconnecting end section 16 of a conduit loop 60 as illustrated herein. These hook elements may have various shapes as described in my co-pending application Ser. No. 12/497,560. As shown in FIG. 9, and depending on the dimension of the pile a sidewall, such as the sidewall 42', may have two hook elements 51 to secure two conduit loops 60 thereagainst. Of course, depending on the make-up of the ground in which the pile is intended to be driven and depths of the insertions of these conduit loops, the conduit retaining means may be suitably selected.

FIG. 8 shows a further modification of the hollow steel pile 40 and, as herein shown, it may be provided with guide channel elements 41 of different configurations and the conduit loops 16 may be disposed diagonally as previously described or transversely thereto as illustrated in FIGS. 6A and 6B.

FIG. 10 illustrates a still further embodiment herein a circular hollow steel pile 50, and it also illustrates various types of retaining means which may be welded to the outer sidewall of the pile 50. These retaining means are described hereinabove. The illustration in FIG. 10 is simply to show that various ones of these retaining means may be welded to the outer sidewalls of a hollow circular metal pile to position geothermal conduit loops into the ground.

FIGS. 11, 12 and 13 show different embodiments of the pile. As herein shown, these piles are conduit loop supporting piles and not adapted to support structures. These piles would be left in the ground with the conduit loops. The piles 70, 71 and 72 may be constructed of any suitable extruded material having sufficient rigidity to be driven into the soil and their purpose is to position the pile in the soil while also providing some protection to the conduit loop formed by the loop sections 17 and 17'. Metal inserts 73 may also be snap-fitted in the channels 74, if desirable, to provide better conductivity to provide thermal exchange between the fluid within the conduit sections 17 and 17' and the surrounding earth. The pile could be extruded from a combination of plastics material and wood fibers or recycled products. The pile can have various shapes, such as illustrated by FIGS. 11, 12 and 13. As shown in FIG. 13, the conduit sections are only partly retained within the channel sections 74.

When the conduits are recessed, this eliminates friction between the conduits and the surrounding earth and thereby prevents the conduits from stretching when driven into the soil. The extruded material is inexpensive. These piles may also be very small in diameter, for example down to about 3 inch diameter. Of course, they could also be larger piles of 12 inches in diameter, for example.

With reference now to FIGS. 14 and 15, there is shown a still further embodiment of the piles wherein this pile 75 is formed of extruded aluminum. It is shaped whereby to form projecting fins 76 to provide a greater contact area with the surrounding ground to provide better thermal exchange therewith and with the conduit sections 17 and 17' fitted in the opposed channels 77 thereof. The hollow center core 78 also provides exposure to the soil but that area may also be completely filled, as shown in FIG. 15, wherein the center core 79 is solid to provide more rigidity for driving the pile into the ground. The center core 79 may also be formed of a material which is more rigid permitting the application of a driving force thereon to drive the pile 75 into the ground. This center piece 79 is likely more expensive and therefore could be withdrawn after the pile is fully driven into the ground.

It is within the ambit of the present invention to cover any obvious modifications of the examples as described herein, provided such modifications fall within the scope of the appended claims.

I claim:

1. A pile adapted to be driven into the ground, said pile having retaining means to retain one or more geothermal conduit loops, each conduit loop being formed by opposed longitudinal conduit sections interconnected at a lower end by an interconnecting section, said conduit loops being adapted for the flow of a heat exchange fluid therein, said retaining means retaining said one or more conduit loops in close proximity with said pile as said pile is driven into the ground, said pile being a casted pile constructed of a solid material, said retaining means being comprised by at least two straight spaced-apart channels formed in an outer surface of said solid material and configured to receive therein a respective one of said opposed longitudinal conduit sections of one of said conduit loops, said channels being of curved concave transverse cross-section to receive therein one of said conduit sections in close contact therewith, said conduit sections having a circular cross-section.

2. The pile adapted to be driven into the ground as claimed in claim 1 wherein there are at least two of said retaining means to retain at least two of said conduit loops spaced-apart about said pile.

3. The pile adapted to be driven into the ground as claimed in claim 1 wherein said channels have a metal liner secured to an outer surface thereof for contact with said conduit, said metal liner providing a thermally conductive surface for heat exchange with said conduit.

4. The pile adapted to be driven into the ground as claimed in claim 3 wherein a thermally conductive protective cover is secured to said metal liner to encapsulate said conduit sections of said conduit-loop therein to protect said conduit sections against ground obstacles in said ground in which said pile is driven.

5. The pile adapted to be driven into the ground as claimed in claim 3 wherein a thermally insulating liner is interposed between said metal liner and said outer surface of said channel.

6. The pile adapted to be driven into the ground as claimed in claim 5 wherein said interconnecting section is retained in a ground penetrating head member secured to a lower end of said pile.

7. The pile adapted to be driven to the ground as claimed in claim 6 wherein said interconnecting section is a curved interconnecting section.

8. The pile adapted to be driven into the ground as claimed in claim 1 wherein said channels are dimensioned to receive therein said conduit whereby said conduit is recessed from said outer surface of said solid mass material.

9. The pile adapted to be driven into the ground as claimed in claim 1 wherein said solid material is one of cast concrete, reinforced concrete, metal and structural plastics.

10. The pile adapted to be driven into the ground as claimed in claim 1 wherein said pile is formed from two or more pile sections interconnected together by pile end connectors.

11. The pile adapted to be driven into the ground as claimed in claim 10 wherein one of said pile sections also comprises an interconnecting passage to receive said interconnecting section of said conduit loop.

12. The pile adapted to be driven into the ground as claimed in claim 1 wherein said pile is of square or rectilinear cross-section defining four flat elongated surfaces, at least one of said surfaces having said two straight spaced-apart channels extending longitudinally therein from end-to-end.

13. The pile adapted to be driven into the ground as claimed in claim 1 wherein a ground penetrating head is secured to a lower end of said pile.

14. The pile adapted to be driven into the ground as claimed in claim 1 wherein said pile is a hollow steel pile, said retaining means being secured to said outer surface of said hollow steel pile.

15. The pile adapted to be driven into the ground as claimed in claim 1 wherein there is further provided a guide collar positioned about said pile over a top surface of said ground in which said pile is driven whereby to guide said opposed longitudinal conduit sections in respective ones of said attachment means secured to an outer sidewall of said pile as said pile is driven into said ground.

16. The pile adapted to be driven into the ground as claimed in claim 1 wherein said pile is a structure supporting pile.

17. The pile adapted to be driven into the ground as claimed in claim 1 wherein said pile is a conduit loop supporting pile.

18. The pile adapted to be driven into the ground as claimed in claim 17 wherein said pile is formed from an extrusion of material suitable to be driven into said ground.

19. The pile adapted to be driven into the ground as claimed in claim 18 wherein said material is a thermally conductive material.

20. The pile adapted to be driven into the ground as claimed in claim 19 wherein said conduit sections are dimensioned for press-fit retention of said longitudinal conduit sections therein.

21. The pile adapted to be driven into the ground as claimed in claim 19 wherein said pile is extruded from aluminum and further provided with fins to provide conductive surface for the transfer of heat between said conduit sections and the ground in contact therewith.

22. A pile adapted to be driven into the ground, said pile having retaining means to retain one or more geothermal conduit loops, each conduit loop being formed by opposed longitudinal conduit sections interconnected at a lower end by an interconnecting section, said conduit loops being adapted for the flow of a heat exchange fluid therein, said retaining means retaining said one or more conduit loops in close proximity with said pile as said pile is driven into the ground, a casted pile constructed of a solid material, said retaining means being comprised by at least two straight spaced-apart channels formed in an outer surface of said solid material and configured to receive therein a respective one of said opposed longitudinal conduit sections of one of said conduit loops, said channels being of U-shaped cross-section and dimensioned to receive therein said conduit whereby said conduit is recessed from said outer surface of said solid mass material.

23. The pile adapted to be driven into the ground as claimed in claim 22 wherein there are at least two of said retaining means to retain at least two of said conduit loops spaced-apart about said pile.

24. The pile adapted to be driven into the ground as claimed in claim 22 wherein said channels have a metal liner secured to an outer surface thereof for contact with said conduit, said metal liner providing a thermally conductive surface for heat exchange with said conduit.

25. The pile adapted to be driven into the ground as claimed in claim 24 wherein a thermally conductive protective cover is secured to said metal liner to encapsulate said conduit sections of said conduit-loop therein to protect said conduit sections against ground obstacles in said ground in which said pile is driven.

26. The pile adapted to be driven into the ground as claimed in claim 24 wherein a thermally insulating liner is interposed between said metal liner and said outer surface of said channel.

27. The pile adapted to be driven into the ground as claimed in claim 22 wherein said solid material is one of cast concrete, reinforced concrete, metal and structural plastics.

28. The pile adapted to be driven into the ground as claimed in claim 22 wherein said pile is formed from two or more pile sections interconnected together by pile end connectors.

29. The pile adapted to be driven into the ground as claimed in claim 28 wherein one of said pile sections also comprises an interconnecting passage to receive said interconnecting section of said conduit loop.

30. The pile adapted to be driven into the ground as claimed in claim 22 wherein said pile is of square or rectilinear cross-section defining four flat elongated surfaces, at least one of said surfaces having said two straight spaced-apart channels extending longitudinally therein from end-to-end.

31. The pile adapted to be driven into the ground as claimed in claim 22 wherein a ground penetrating head is secured to a lower end of said pile.

32. The pile adapted to be driven into the ground as claimed in claim 22 wherein there is further provided a guide collar positioned about said pile over a top surface of said ground in which said pile is driven whereby to guide said opposed longitudinal conduit sections in respective ones of said attachment means secured to an outer sidewall of said pile as said pile is driven into said ground.

33. The pile adapted to be driven into the ground as claimed in claim 22 wherein said pile is a structure supporting pile.

34. The pile adapted to be driven into the ground as claimed in claim 22 wherein said pile is a conduit loop supporting pile.

35. The pile adapted to be driven into the ground as claimed in claim 34 wherein said pile is formed from an extrusion of material suitable to be driven into said ground.

36. The pile adapted to be driven into the ground as claimed in claim 35 wherein said material is a thermally conductive material.

37. The pile adapted to be driven into the ground as claimed in claim 36 wherein said conduit sections are dimensioned for press-fit retention of said longitudinal conduit sections therein.

38. The pile adapted to be driven into the ground as claimed in claim 36 wherein said pile is extruded from aluminum and further provided with fins to provide conductive surface for the transfer of heat between said conduit sections and the ground in contact therewith.

39. A pile adapted to be driven into the ground, said pile having retaining means to retain one or more geothermal conduit loops, each conduit loop being formed by opposed longitudinal conduit sections interconnected at a lower end by an interconnecting section, said conduit loops being adapted for the flow of a heat exchange fluid therein, said retaining means retaining said one or more conduit loops in close proximity with said pile as said pile is driven into the ground, said pile being a casted pile constructed of a solid material, said retaining means being comprised by at least two straight spaced-apart channels formed in an outer surface of said solid material and configured to receive therein a respective one of said opposed longitudinal conduit sections of one of said conduit loops, said pile is formed from two or more pile sections interconnected together by pile end connectors, one of said pile sections also comprises an interconnecting passage to receive said interconnecting section of said conduit loop.

40. The pile adapted to be driven into the ground as claimed in claim 39 wherein there are at least two of said retaining means to retain at least two of said conduit loops spaced-apart about said pile.

41. A pile adapted to be driven into the ground as claimed in claim 39 wherein said channels are of curved concave transverse cross-section to receive therein one of said conduit sections in close contact therewith, said conduit sections having a circular cross-section.

42. The pile adapted to be driven into the ground as claimed in claim 41 wherein said channels have a metal liner secured to an outer surface thereof for contact with said conduit, said metal liner providing a thermally conductive surface for heat exchange with said conduit.

43. The pile adapted to be driven into the ground as claimed in claim 42 wherein a thermally conductive protective cover is secured to said metal liner to encapsulate said conduit sections of said conduit-loop therein to protect said conduit sections against ground obstacles in said ground in which said pile is driven.

44. The pile adapted to be driven into the ground as claimed in claim 42 wherein a thermally insulating liner is interposed between said metal liner and said outer surface of said channel.

45. The pile adapted to be driven into the ground as claimed in 44 wherein said retaining means is constituted by guide channel elements secured to said outer surface and configured to receive therein a straight leg section of said opposed conduit sections, said interconnecting section being retained in a ground penetrating head member secured to a lower end of said pile.

46. The pile adapted to be driven into the ground as claimed in claim 45 wherein said interconnecting section is a curved interconnecting section.

47. The pile adapted to be driven into the ground as claimed in claim 45 wherein said guide channel element is a metal strip element welded to a sidewall of said hollow steel pipe, said guide channel being a concave channel dimensioned for close fit contact with said longitudinal conduit loop sections, there being at least two of said metal strip elements welded spaced-apart along respective longitudinal axes of said hollow steel pipe to receive a respective one of said opposed longitudinal conduit sections.

48. The pile adapted to be driven into the ground as claimed in claim 39 wherein said channels are of U-shaped cross-section and dimensioned to receive therein said conduit whereby said conduit is recessed from said outer surface of said solid mass material.

49. The pile adapted to be driven into the ground as claimed in claim 39 wherein said solid material is one of cast concrete, reinforced concrete, metal and structural plastics.

50. The pile adapted to be driven into the ground as claimed in claim 39 wherein said pile is of square or rectilinear cross-section defining four flat elongated surfaces, at least one of said surfaces having said two straight spaced-apart channels extending longitudinally therein from end-to-end.

51. The pile adapted to be driven into the ground as claimed in claim 39 wherein a ground penetrating head is secured to a lower end of said pile.

52. The pile adapted to be driven into the ground as claimed in claim 39 wherein said pile is a hollow steel pile, said retaining means being secured to an outer surface of said hollow steel pile.

53. The pile adapted to be driven into the ground as claimed in claim 52 wherein said hollow steel pile is of square or circular cross-section.

54. The pile adapted to be driven into the ground as claimed in claim 39 wherein there is further provided a guide collar positioned about said pile over a top surface of said ground in which said pile is driven whereby to guide said opposed longitudinal conduit sections in respective ones of said attachment means secured to an outer sidewall of said pile as said pile is driven into said ground.

55. The pile adapted to be driven into the ground as claimed in claim 39 wherein said pile is a structure supporting pile.

56. The pile adapted to be driven into the ground as claimed in claim 39 wherein said pile is a conduit loop supporting pile.

57. The pile adapted to be driven into the ground as claimed in claim 56 wherein said pile is formed from an extrusion of material suitable to be driven into said ground.

58. The pile adapted to be driven into the ground as claimed in claim 57 wherein said material is a thermally conductive material.

59. The pile adapted to be driven into the ground as claimed in claim 58 wherein said conduit sections are dimensioned for press-fit retention of said longitudinal conduit sections therein.

60. The pile adapted to be driven into the ground as claimed in claim 58 wherein said pile is extruded from aluminum and further provided with fins to provide conductive surface for the transfer of heat between said conduit sections and the ground in contact therewith.

61. A pile adapted to be driven into the ground, said pile having retaining means to retain one or more geothermal conduit loops, each conduit loop being formed by opposed longitudinal conduit sections interconnected at a lower end by an interconnecting section, said conduit loops being adapted for the flow of a heat exchange fluid therein, said retaining means retaining said one or more conduit loops in close proximity with said pile as said pile is driven into the ground, said pile being a casted pile constructed of a solid material, said retaining means being comprised by at least two straight spaced-apart channels formed in an outer surface of said solid material and configured to receive therein a respective one of said opposed longitudinal conduit sections of one of said conduit loops, said channels being of curved concave transverse cross-section to receive therein one of said conduit sections in close contact therewith, said conduit sections having a circular cross-section, said channels having a metal liner secured to an outer surface thereof for contact with said conduit, said metal liner providing a thermally conductive surface for heat exchange with said conduit, and wherein a thermally insulating liner is interposed between said metal liner and said outer surface of said channel.

62. The pile adapted to be driven into the ground as claimed in claim 61 wherein there are at least two of said retaining means to retain at least two of said conduit loops spaced-apart about said pile.

63. The pile adapted to be driven into the ground as claimed in claim 61 wherein a thermally conductive protective cover is secured to said metal liner to encapsulate said conduit sections of said conduit-loop therein to protect said conduit sections against ground obstacles in said ground in which said pile is driven.

64. The pile adapted to be driven into the ground as claimed in claim 61 wherein said solid material is one of cast concrete, reinforced concrete, metal and structural plastics.

65. The pile adapted to be driven into the ground as claimed in claim 61 wherein said pile is formed from two or more pile sections interconnected together by pile end connectors.

66. The pile adapted to be driven into the ground as claimed in claim 65 wherein one of said pile sections also comprises an interconnecting passage to receive said interconnecting section of said conduit loop.

67. The pile adapted to be driven into the ground as claimed in claim 61 wherein said pile is of square or rectilinear cross-section defining four flat elongated surfaces, at least one of said surfaces having said two straight spaced-apart channels extending longitudinally therein from end-to-end.

68. The pile adapted to be driven into the ground as claimed in claim 61 wherein a ground penetrating head is secured to a lower end of said pile.

69. The pile adapted to be driven into the ground as claimed in claim 61 wherein there is further provided a guide collar positioned about said pile over a top surface of said ground in which said pile is driven whereby to guide said opposed longitudinal conduit sections in respective ones of said attachment means secured to an outer sidewall of said pile as said pile is driven into said ground.

70. The pile adapted to be driven into the ground as claimed in claim 61 wherein said pile is a structure supporting pile.

71. The pile adapted to be driven into the ground as claimed in claim 61 wherein said pile is a conduit loop supporting pile.

72. The pile adapted to be driven into the ground as claimed in claim 71 wherein said pile is formed from an extrusion of material suitable to be driven into said ground.

73. The pile adapted to be driven into the ground as claimed in claim 72 wherein said material is a thermally conductive material.

74. The pile adapted to be driven into the ground as claimed in claim 73 wherein said conduit sections are dimensioned for press-fit retention of said longitudinal conduit sections therein.

75. The pile adapted to be driven into the ground as claimed in claim 73 wherein said pile is extruded from aluminum and further provided with fins to provide conductive surface for the transfer of heat between said conduit sections and the ground in contact therewith.

76. A pile adapted to be driven into the ground, said pile having retaining means to retain one or more geothermal conduit loops, each conduit loop being formed by opposed longitudinal conduit sections interconnected at a lower end by an interconnecting section, said conduit loops being adapted for the flow of a heat exchange fluid therein, said retaining means retaining said one or more conduit loops in close proximity with said pile as said pile is driven into the ground, said pile being a hollow steel pile, said retaining means being secured to an outer surface of said hollow steel pile said retaining means being constituted by one or more hook members secured to a sidewall of said pile for retention contact of said interconnecting section of said conduit loop to draw said conduit loop into the ground.

77. The pile adapted to be driven into the ground as claimed in claim 76 wherein there are at least two of said retaining means to retain at least two of said conduit loops spaced-apart about said pile.

78. The pile adapted to be driven into the ground as claimed in claim 76 wherein said pile is formed from two or more pile sections interconnected together by pile end connectors.

79. The pile adapted to be driven into the ground as claimed in claim 76 wherein a ground penetrating head is secured to a lower end of said pile.

80. The pile adapted to be driven into the ground as claimed in claim 76 wherein said hollow steel pile is of square or circular cross-section.

81. The pile adapted to be driven into the ground as claimed in claim 76 wherein there is further provided a guide collar positioned about said pile over a top surface of said ground in which said pile is driven whereby to guide said opposed longitudinal conduit sections in respective ones of said attachment means secured to an outer sidewall of said pile as said pile is driven into said ground.

82. The pile adapted to be driven into the ground as claimed in claim 76 wherein said pile is a structure supporting pile.

83. The pile adapted to be driven into the ground as claimed in claim 76 wherein said pile is a conduit loop supporting pile.

\* \* \* \* \*